United States Patent
Cao et al.

(10) Patent No.: US 8,200,267 B2
(45) Date of Patent: Jun. 12, 2012

(54) ROBUST PAGING INDICATOR DETECTION

(75) Inventors: Aijun Cao, Sullentuna (SE); Andreas Jakobsson, Piteå (SE); Jan Johansson, Norrfjärden (SE); Fredrik Lundberg, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 896 days.

(21) Appl. No.: 12/239,480

(22) Filed: Sep. 26, 2008

(65) Prior Publication Data

US 2010/0079244 A1 Apr. 1, 2010

(51) Int. Cl.
*H04B 7/00* (2006.01)
*H04B 17/00* (2006.01)
*H04W 68/00* (2009.01)

(52) U.S. Cl. ..... 455/515; 455/517; 455/458; 455/67.11; 455/67.14

(58) Field of Classification Search ............... 455/458, 455/515, 516, 517, 67.11, 67.14
See application file for complete search history.

(56) References Cited

U.S. PATENT DOCUMENTS

| | | | |
|---|---|---|---|
| 6,650,912 B2 | 11/2003 | Chen et al. | |
| 7,062,285 B2 | 6/2006 | Yue | |
| 7,228,107 B2 * | 6/2007 | Kim | 455/67.13 |
| 2005/0181731 A1 * | 8/2005 | Asghar et al. | 455/63.1 |
| 2006/0135073 A1 | 6/2006 | Kurapati et al. | |
| 2007/0076643 A1 | 4/2007 | Yang et al. | |
| 2007/0087698 A1 | 4/2007 | Lee | |
| 2009/0154385 A1 * | 6/2009 | Makhija et al. | 370/311 |

FOREIGN PATENT DOCUMENTS

| | | |
|---|---|---|
| EP | 1 499 141 | 1/2005 |
| EP | 1503605 A2 | 2/2005 |
| JP | 2004140611 | 5/2004 |

OTHER PUBLICATIONS

Ericsson, "Power Reference for AICH and PICH," TSG-RAN Working Group 1 meeting #7bis, Kyongju, South Korea, Oct. 4-5, 1999, p. 1.
Asghar, Z. et al. "Automatic Threshold Control for Improved Paging Detection Performance in Wireless Systems." Globecom 04 IEEE Global Telecommunications Conference, 2004. vol. 5, Nov. 29-Dec. 3, 2004, pp. 3310-3315. IEEE, Piscataway, NJ. USA.
3GPP TS 25.211, V6.9.0 (Nov. 2007). 3rd Generation Partnership Project; Technical Specification Group Radio Access Network; Physical channels and mapping of transport channels onto physical channels (FSS) (Release 6). 3GPP, Valbonne, France.

* cited by examiner

*Primary Examiner* — Un C Cho
(74) *Attorney, Agent, or Firm* — Coats & Bennett, P.L.L.C.

(57) ABSTRACT

A robust method of page indication (PI) detection improves the probability of detecting a transmitted PI under conditions that decrease the probability of accurate PI detection. The method includes choosing a standard value of a PI threshold against which to compare accumulated PI bits when the probability of correctly detecting the PI is high, and choosing a derived value of the PI threshold lower than the standard value when the probability of correctly detecting the PI is low. The derived PI threshold value determination includes a factor indicative of a desired probability of accurate PI detection.

18 Claims, 2 Drawing Sheets ns system (UMTS) as defined in 3rd Generation Partnership Project (3GPP) specifications.

ROBUST PAGING INDICATOR DETECTION

FIELD OF THE INVENTION

The present invention relates generally to page detection in a wireless communication network, and in particular to a robust method of detecting a page indication under conditions that decrease the probability of accurate page indication detection.

BACKGROUND

Wireless communication networks contact individual subscribers' user equipment (UE) that is camped on a base station or Node-B, by transmitting a "page" unique to the UE throughout the cell or sector. The page may take different forms in systems operating under different protocols (W-CDMA, GSM, UMTS, etc.). The paged UE is directed to a particular channel, such as a control channel, to receive more detailed information, such as the network event prompting the page (incoming call, location update, etc.) and how it should respond. One form of paging UEs comprises assigning to each UE camped on a base station, a section of a frame of a paging indicator channel, to monitor for a paging indicator (PI). If the UE detects a PI, it monitors a predetermined channel after a predetermined delay to obtain control information regarding the page.

A straightforward way of monitoring for the PI is to accumulate a predetermined number of received bits at the UE's assigned frame position to generate a decision variable, and compare the decision variable against a threshold. For example, where bits are modulated as +1/−1, the threshold may be 0. That is, a decision variable greater than 0 indicates the presence of a PI, and a decision variable less than 0 indicates no PI was transmitted. This simple approach mathematically achieves the minimum error probability. However, the mathematical minimum error probability is only optimal if the two error cases—missing a transmitted PI and falsely detecting a PI where none was transmitted—have equal consequence. In real-world systems, the former error has far greater consequences than the latter.

If a UE misses a transmitted PI, it will fail to subsequently monitor a control channel, and will not response to the network. The UE may thus miss an incoming call, it may cause the network to assume the UE has left the cell or powered down, or have some other deleterious impact on network mobility management. Recovery from this error may require significant processing by higher order protocol layers. On the other hand, if the UE falsely detects a PI where none was transmitted, the UE simply monitors its assigned control channel for system signaling, which it will not receive. The cost is simply the power expended to needlessly monitor the control channel for one duration.

Under a scheme of simple thresholding against a fixed, standard value, as described above, the probability of correct PI detection depends on radio conditions, and cannot be guaranteed to any required degree of accuracy. For example, under radio conditions yielding a high signal to interference ratio (SIR), there is a low probability of missed PI detection. However, under a low SIR, the probability of missed PI detection increases.

SUMMARY

In one or more embodiments of the present invention, a robust method of page indication (PI) detection improves the probability of detecting a transmitted PI under conditions that decrease the probability of accurate PI detection. The method includes choosing a standard value for a PI threshold against which to compare accumulated PI bits when the probability of correctly detecting the PI is high, and choosing a derived value for the PI threshold that is lower than the standard value when the probability of correctly detecting the PI is low. The derived PI threshold value determination includes a factor indicative of a desired probability of accurate PI detection. In one embodiment, a UE includes a transceiver and a controller operative to determine the conditions and select the standard or derived PI threshold value. Factors that may affect the probability of accurate PI detection include a low SNR, the power offset between the paging indicator channel and a common pilot channel, and the length of a repetitive bit sequence comprising the PI.

DETAILED DESCRIPTION

Embodiments of the present invention are described herein in the context of paging in the Universal Mobile Telecommunications System (UMTS) as defined in 3rd Generation Partnership Project (3GPP) specifications. Those of skill in the art will readily recognize, however, that the present invention is not limited to this particular protocol, but rather may be advantageously applied to improve paging indication detection in a wide variety of wireless communication networks.

In UMTS, the Paging Channel (PCH) is a downlink transport channel that is always transmitted over the entire cell. The PCH is associated with the transmission of physical-layer generated Paging Indicators (PI). System information block type 5 (SIB 5) defines common channels to be employed in Idle mode. One or more PCHs may be established in a cell. Each Secondary Common Control Physical Channel (S-CCPCH) is uniquely associated with one PCH. Thus, for each defined PCH there is associated one Paging Indicator Channel (PICH).

The PICH is a fixed rate (SF=256) physical channel that carries the paging indicators. The PICH is always associated with an S-CCPCH to which a PCH transport channel is mapped. One PICH radio frame length of 10 ms comprises 300 bits. Of these, 288 bits are used to carry paging indicators (PI) (the remaining 12 bits are reserved for future use). A PI is a repetitive sequence of bits, which may have a repetition factor of 8, 4, 2, or 1. The bits are modulated as +1/−1. Each PI position within the frame depends on the current SFN number together with the paging group number. The PI positions are uniquely assigned to UEs, and communicated to them, along with the repetition factor, on SIB 5. Thus, a plurality of UEs may be paged by the PICH in the same frame.

To detect a PI, a UE monitors the PICH at its assigned PI position within the current frame, and accumulates the repetition factor number of bits to form a decision variable. The decision variable is conventionally compared to a standard value of a PI threshold. For example, where the PI bits are modulated as +1/−1, a decision variable greater than 0 indicates the presence of a PI, and a decision variable less than 0 indicates no PI was transmitted.

Figure 1:
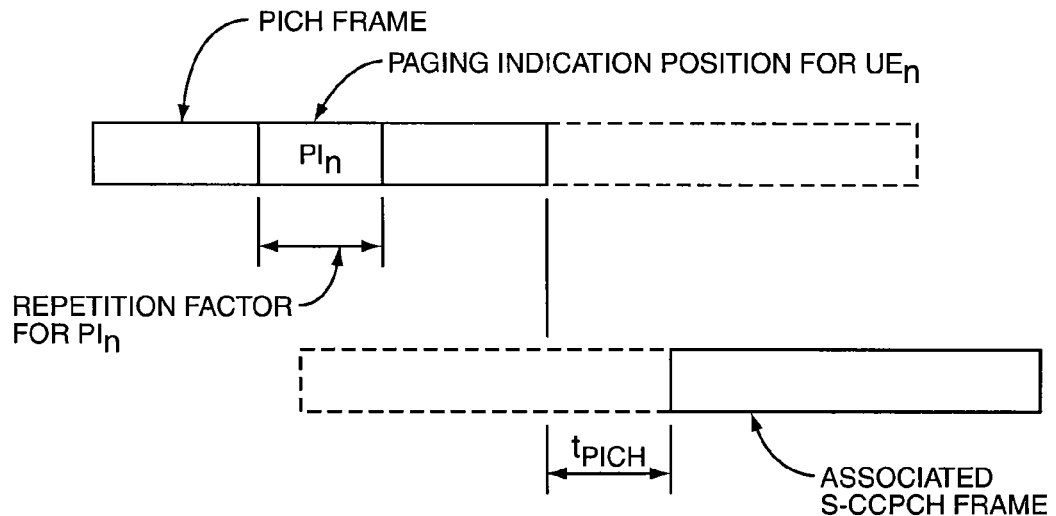
FIG. 1 is a functional block diagram of PICH and S-CCPCH frames.

When a UE detects a PI in its assigned position of the PICH frame, it monitors the associated S-CCPCH frame, beginning $t_{PICH}$=7680 chips=3 slots after the end of the PICH frame in which it detected a PI. The S-CCPCH contains information about the page, which informs the UE's further action to respond to the page. FIG. 1 depicts the relationship between a PICH frame and its associated S-CCPCH frame. FIG. 1 also depicts $PI_n$ in a position associated with $UE_n$, and the $PI_n$ repetition factor.

As discussed above, the use of a fixed, standard PI threshold value, such as 0, without regard to channel conditions or other factors that may impact probability of correctly detecting the page indication, should lead to an equal number of errors in either direction—that is, as many false alarms as missed pages. However, the two error cases have dramatically different impacts on system performance. According to embodiments of the present invention, the value of the PI threshold against which the decision variable is compared is lowered under conditions of low probability of correct PI detection. This biases the detection outcome to favor detecting a PI. This bias avoids the very costly error of missing a valid PI, at the cost of falsely detecting some PIs (the penalty for which is inconsequential).

Assuming channel estimates are normalized by noise power, the decision variable of the correlation output of PI detection is given by $$Z=\sqrt{2}\beta N \cdot SIR \cdot I + n \qquad (1)$$

where
- β is the power offset of PICH relative a common pilot channel (CPICH), e.g., −10 . . . 5 dB;
- N is the repetition factor, e.g., 8, 4, 2, 1;
- SIR is the instantaneous signal to interference ratio of CPICH of the slots where the PICH is located;
- I +1 if PI is present, −1 if PI was not transmitted; and
- n is noise, with a variance N·SIR.

β and N are known from SIB 5, and need not be calculated. According to (1), a target detection probability, e.g., 99.5% is set. Next a factor labeled PICH_L_MDR_FACTOR is determined, and a new PI threshold value T' is calculated as $$T'=\sqrt{2}\beta N \cdot SIR - PICH\_L\_MDR\_FACTOR \cdot \sqrt{N \cdot SIR} \qquad (2)$$

In one embodiment, the factor PICH_L_MDR_FACTOR is defined as a function of $E_C/N_0$ of CPICH, to adapt to different scenarios.

The actual PI threshold value T for comparison to the decision variable is then set to the minimum value between T' and 0:

$$T=\min(T',0) \qquad (3)$$

If the radio conditions are good, the calculated PI threshold value T' may be greater than 0. In this case, the actual PI threshold value T is set to 0 according to (3), and PI detection proceeds as in the prior art. On the other hand, if the radio conditions are poor, and the calculated PI threshold value T' is less than 0, then the decision variable is compared against T', increasing the probability of detecting a PI (and concomitantly increasing the probability of a false detection).

In one embodiment, to avoid the computational effort of calculating T' for each PI detection, a plurality of T' values may be calculated for a corresponding plurality of conditions, and the value pairs stored in a look-up table, which may be interpolated for intermediate values.

The conditions, or factors, that may influence the probability of an accurate PI detection include the power offset of PICH to CPICH; the PI repetition factor; and the quality of the air interface between the UE and the network (e.g., noise, interference, and the like, as measured by SIR, $E_C/N_0$, or other metrics).

Figure 2:
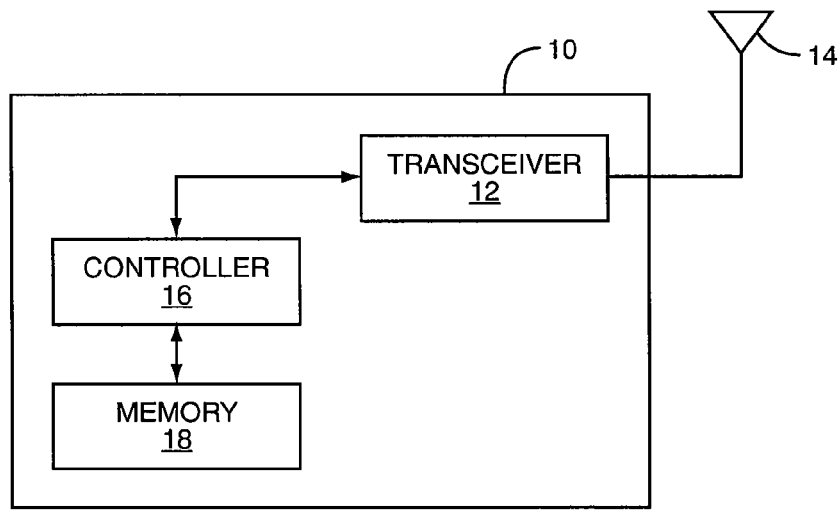
FIG. 2 is a functional block diagram of user equipment.

FIG. 2 depicts a UE 10, which may for example comprise a mobile station such as cell phone or PDA, a laptop or notebook computer, a vehicle-mounted remote device, or the like. The UE includes a transceiver 12 connected to an antenna 14 and operative to effect wireless data transfer over an air interface with a wireless communication network. A controller 16, which may comprise a microprocessor, Digital Signal Processor (DSP), or the like, controls the overall operation of the UE 10 in accordance with the UMTS or other applicable protocol. The controller 16 additionally is operative to monitor one or more factors affecting the probability of correctly detecting a page indication (e.g., SIR), and to derive a PI threshold value appropriate to the conditions, as described above (i.e., T' or 0). Memory 18, operatively connected to the controller 16, stores software programs that execute on the controller 16 to perform the above-described functions. The memory 18 may additionally store one or more look-up tables of measured factor/T' pairs, to obviate the need to repeatedly calculate T' values.

Figure 3:
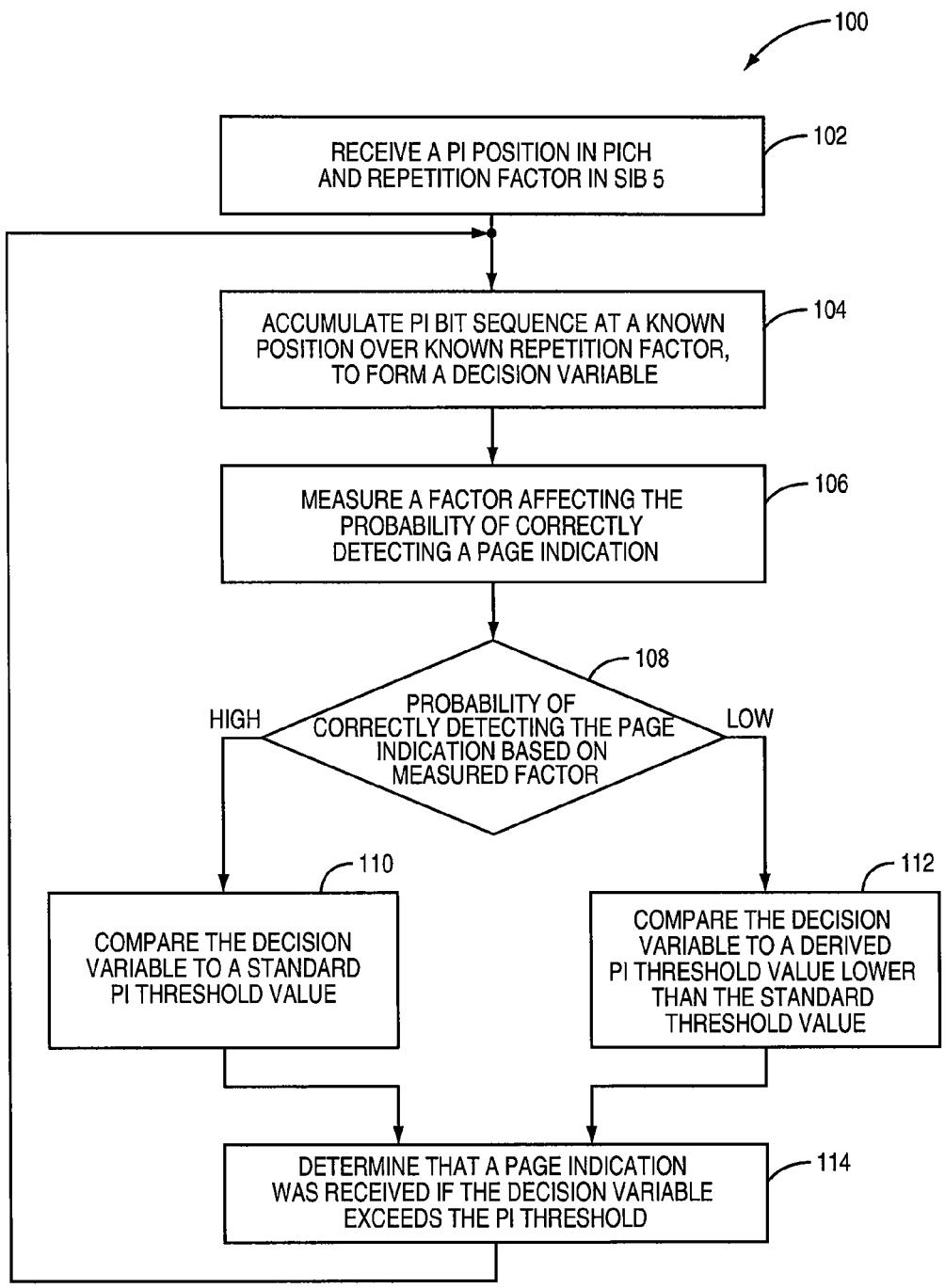
FIG. 3 is a flow diagram of a method of robust page indication detection.

FIG. 3 depicts a robust method 100 of detecting a paging indication (PI). Initially, a UE 10 receives the PI position within the PICH frame and the repetition factor for the PI in a SIB 5 (block 102). The UE 10 then looks for a page directed to it by accumulating a PI bit sequence at a known position in the PICH frame over a known repetition factor, to form a decision variable (block 104). The UE 10 measures a factor affecting the probability of correctly detecting a PI, such as SIR (block 106). If the probability of correctly detecting the PRI, as indicated by the measured factor (block 108) is high, the decision variable is compared to a standard value of a PI threshold, such as 0 (block 110). On the other hand, if the probability of correctly detecting the PRI, as indicated by the measured factor (block 108) is low, the decision variable is compared to a derived value for the PI threshold T' that is lower than the standard value (block 112). T' may be derived during each iteration of the method 100, or may be retrieved from a look-up table in memory 18 based on the measured factor. In either case, the UE 10 determines that a page indication was received if the decision variable exceeds the relevant PI threshold value (block 114), and monitors the S-CCPCH 7680 chips later. The method then repeats when the UE 10 again checks for a page (block 104).

According to embodiments of the present invention, a more robust PI detection methodology is employed only when the probability of an accurate PI detection is reduced, such as under poor channel quality conditions. The downside of this change—increasing the probability of a false alarm—is trivial, since the only cost is the power wasted in the UE needlessly monitoring a single S-CCPCH frame for each false alarm. When the probability of an accurate PI detection is high (e.g., good channel quality), the prior art standard PI threshold value of 0 is used.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of robust page indication (PI) detection by a user equipment (UE) in a wireless communication network, comprising:

accumulating a received bit sequence, of a known length, at a predetermined position within a frame of a page indication channel, to form a decision variable;

measuring a factor affecting the probability of correctly detecting a page indication;

if the measured factor indicates a high probability of correctly detecting the page indication, comparing the decision variable to a standard value of a PI threshold;

if the measured factor indicates a low probability of correctly detecting the page indication, comparing the decision variable to a derived value of the PI threshold lower than the standard value; and determining that the page indication was received if the decision variable exceeds the PI threshold.

2. The method of claim 1 wherein the factor affecting the probability of correctly detecting the page indication is the power offset of a page indication channel (PICH) to a common pilot channel (CPICH).

3. The method of claim 1 wherein the factor affecting the probability of correctly detecting a page indication is the length of the page indication bit sequence.

4. The method of claim 1 wherein the factor affecting the probability of correctly detecting a page indication is the quality of the air interface between the user equipment and the network.

5. The method of claim 1 wherein a plurality of values for the derived PI threshold value are calculated for a corresponding plurality of values of the measured factor, the plurality of value pairs are stored in a look-up table, and the table is indexed with the measured factor to obtain the derived PI threshold value.

6. The method of claim 1 wherein the bit sequence is modulated as +1/−1, and wherein the standard PI threshold value is 0.

7. The method of claim 6 wherein the derived PI threshold value T' is given by:

$$T'=\sqrt{2}\beta N \cdot SIR - PICH\_L\_MDR\_FACTOR \cdot \sqrt{N \cdot SIR}$$

where β is the power offset of page indication channel relative a common pilot channel;

N is the length of the bit pattern;

SIR is the signal to interference ratio for the associated slot of the common pilot channel; and PICH_L_MDR_FACTOR is a target detection probability factor.

8. The method of claim 7 wherein PICH_L_MDR_FACTOR is a predetermined value.

9. The method of claim 7 wherein PICH_L_MDR_FACTOR is a function of $E_C/N_0$ of the common pilot channel, where $E_C/N_0$ is the ratio of chip energy to normalized noise.

10. A wireless communication network user equipment (UE) having robust page indication (PI) detection, comprising:

a transceiver operative to receive data from the network over an air interface on a plurality of channels; and a controller operative to accumulate a received bit sequence, of a known length, at a predetermined position within a frame of a page indication channel, to form a decision variable;

measure a factor affecting the probability of correctly detecting a page indication;

if the measured factor indicates a high probability of correctly detecting the page indication, compare the decision variable to a standard value of a PI threshold;

if the measured factor indicates a low probability of correctly detecting the page indication, compare the decision variable to a derived value of a PI threshold lower than the standard value; and determine that the page indication was received if the decision variable exceeds the PI threshold.

11. The UE of claim 10 wherein the factor affecting the probability of correctly detecting a page indication is the power offset of a page indication channel (PICH) to a common pilot channel (CPICH).

12. The UE of claim 10 wherein the factor affecting the probability of correctly detecting a page indication is the length of the page indication bit sequence.

13. The UE of claim 10 wherein the factor affecting the probability of correctly detecting a page indication is the quality of the air interface between the user equipment and the network.

14. The UE of claim 10 further comprising memory 18, and wherein the controller is further operative to calculate a plurality of derived PI threshold values for a corresponding plurality of values of the measured factor, store the plurality of value pairs in a look-up table in memory, and index the table with the measured factor to obtain the derived PI threshold value.

15. The UE of claim 10 wherein the bit sequence is modulated as +1/−1, and wherein the standard PI threshold value is 0.

16. The UE of claim 15 wherein the derived PI threshold value T' is given by:

$$T'=\sqrt{2}\beta N \cdot SIR - PICH\_L\_MDR\_FACTOR \cdot \sqrt{N \cdot SIR}$$

where β is the power offset of page indication channel relative a common pilot channel;

N is the length of the bit pattern;

SIR is the signal to interference ratio for the associated slot of the common pilot channel; and PICH_L_MDR_FACTOR is a target detection probability factor.

17. The UE of claim 16 wherein PICH_L_MDR_FACTOR is a predetermined value.

18. The UE of claim 16 wherein PICH_L_MDR_FACTOR is a function of $E_C/N_0$ of the common pilot channel, where $E_C/N_0$ is the ratio of chip energy to normalized noise.

* * * * *

UNITED STATES PATENT AND TRADEMARK OFFICE
CERTIFICATE OF CORRECTION

PATENT NO. : 8,200,267 B2  Page 1 of 1
APPLICATION NO. : 12/239480
DATED : June 12, 2012
INVENTOR(S) : Cao et al.

It is certified that error appears in the above-identified patent and that said Letters Patent is hereby corrected as shown below:

Title Page, Item (75), under "Inventors", in Column 1, Line 1, delete "Sullentuna" and insert -- Sollentuna --, therefor.

In Column 6, Line 28, in Claim 14, delete "memory 18," and insert -- memory, --, therefor.

Signed and Sealed this
Twelfth Day of March, 2013

Teresa Stanek Rea
*Acting Director of the United States Patent and Trademark Office*